US011843971B2

United States Patent
Srivastava et al.

(10) Patent No.: US 11,843,971 B2
(45) Date of Patent: Dec. 12, 2023

(54) DYNAMIC ENABLEMENT OF RLC MODE BASED ON UE RF CONDITIONS

(71) Applicant: Cisco Technology, Inc., San Jose, CA (US)

(72) Inventors: Vimal Srivastava, Bangalore (IN); Sri Gundavelli, San Jose, CA (US); Abhishek Dhammawat, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 17/501,987

(22) Filed: Oct. 14, 2021

(65) Prior Publication Data

US 2023/0119693 A1 Apr. 20, 2023

(51) Int. Cl.
*H04W 28/04* (2009.01)
*H04W 76/10* (2018.01)
*H04L 1/20* (2006.01)
*H04W 28/12* (2009.01)
*H04W 60/04* (2009.01)

(52) U.S. Cl.
CPC ............ *H04W 28/04* (2013.01); *H04L 1/203* (2013.01); *H04W 28/12* (2013.01); *H04W 60/04* (2013.01); *H04W 76/10* (2018.02)

(58) Field of Classification Search
CPC ..... H04W 28/04; H04W 76/10; H04W 28/12; H04W 60/04; H04L 1/203
See application file for complete search history.

(56) References Cited

U.S. PATENT DOCUMENTS 9,686,046 B2* 6/2017 El-Saidny ............ H04L 1/1685
2006/0171396 A1 8/2006 Singh et al.
2016/0219458 A1* 7/2016 Kubota ................. H04L 1/1896
(Continued)

FOREIGN PATENT DOCUMENTS

WO 2012025670 A1 3/2012
WO 2020167024 A1 8/2020
WO WO-2022081832 A2 * 4/2022

OTHER PUBLICATIONS

Shreevastav et al., "Dynamic RLC Mode Based Upon Link Adaptation To Reduce Latency and Improve Throughput in Cellular Networks," IEEE 2016.
(Continued)

Primary Examiner — Ajay Cattungal
(74) Attorney, Agent, or Firm — Polsinelli

(57) ABSTRACT

A system and method for dynamic enablement of a RLC mode of a Data Radio Bearer (DRB) based on UE radiofrequency (RF) conditions. A threshold value for a network characteristic is provided to a gNodeB. Changes in the network characteristic correlates to changes in RF channel conditions of the UE. The trigger configures the gNodeB to identify when the network characteristic meets the threshold value for selectively controlling operation of the gNodeB at one of a plurality of different operation modes including an initial radio link control (RLC) mode based on the network characteristic. A Protocol Data Unit (PDU) session is established with the gNodeB operating in an initial RLC mode with the possibility to dynamically switch to a different RLC mode based on RF channel conditions.

18 Claims, 11 Drawing Sheets

(56) References Cited

U.S. PATENT DOCUMENTS

| | | | |
|---|---|---|---|
| 2017/0171764 A1 | 6/2017 | Dimou et al. | |
| 2019/0254074 A1* | 8/2019 | Jeon | H04W 74/02 |
| 2020/0296635 A1* | 9/2020 | Rastegardoost | H04W 72/23 |
| 2020/0314701 A1* | 10/2020 | Talebi Fard | H04W 36/0016 |
| 2020/0389823 A1* | 12/2020 | Xu | H04W 76/20 |
| 2021/0211224 A1 | 7/2021 | Hu et al. | |
| 2021/0360611 A1* | 11/2021 | Manolakos | H04L 5/0053 |
| 2022/0159507 A1* | 5/2022 | Chen | H04L 1/1607 |
| 2022/0191733 A1* | 6/2022 | Ali | H04W 4/40 |
| 2022/0272774 A1* | 8/2022 | Teyeb | H04W 28/0268 |
| 2023/0063139 A1* | 3/2023 | Du | H04W 40/22 |

OTHER PUBLICATIONS

International Search Report and Written Opinion for PCT Application No. PCT/US2022/077473, dated Jan. 9, 2023, 10 pages.

\* cited by examiner

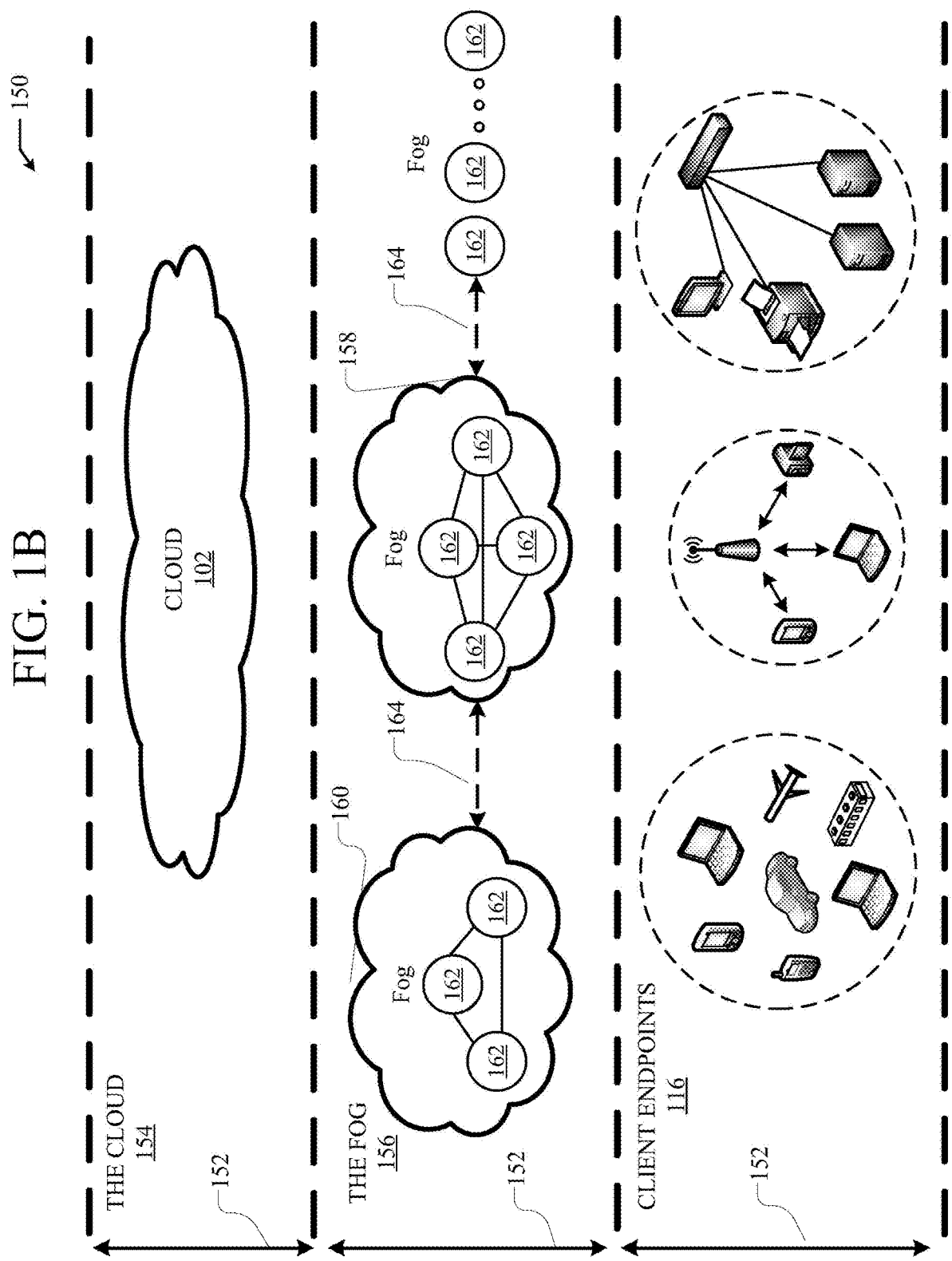

RLC Mode Related Policies

| QoS Flows Attributes | Default RLC Mode | Threshold & New RLC Mode |
|---|---|---|
| DNN = a.com<br>S-NSSAI: 1<br>APPID = ABC<br>5QI = 1 | UM-Mode | PER = 5 in 100<br>AM-Mode |
| DNN = a.com<br>S-NSSAI: 1<br>APPID = ABC<br>5QI = 2 | UM-Mode | PER = 2 in 1000<br>AM-Mode |
| 5QI = 4<br>SUPI = abc123 | UM-Mode | PER = 5 in 10^6<br>AM-Mode |
| 5QI = 4<br>SUPI: 111-999 | gNodeB static configuration | PER = 10 in 10^6<br>AM-Mode |

FIG. 3

DYNAMIC ENABLEMENT OF RLC MODE BASED ON UE RF CONDITIONS

TECHNICAL FIELD

The present disclosure relates generally to dynamic enablement of radio link control (RLC) modes, and more specifically to dynamically enabling different RLC modes based on user equipment (UE) radiofrequency (RF) conditions.

BACKGROUND

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

A radio access network (RAN) typically selects a RLC mode at the time of establishment of a Data Radio Bearer (DRB) without opportunity to subsequently switch between the RLC modes. As such, the configuration of the RLC mode is based on static configuration in the RAN. However, radio channel conditions can change after DRB establishment, such as due to RF interference, electrical interference, weather conditions, UE mobility and due to various other reasons. In turn, this can ultimately affect network service access through the RAN.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1B illustrates an example fog computing architecture;

FIG. 3 illustrates a table indicating example a policy function configuration that sets a dynamic enablement RLC mode based on various QoS flow attributes and packet error rate (PER) thresholds, according to an example of the instant disclosure;

DETAILED DESCRIPTION

Figure 1A:
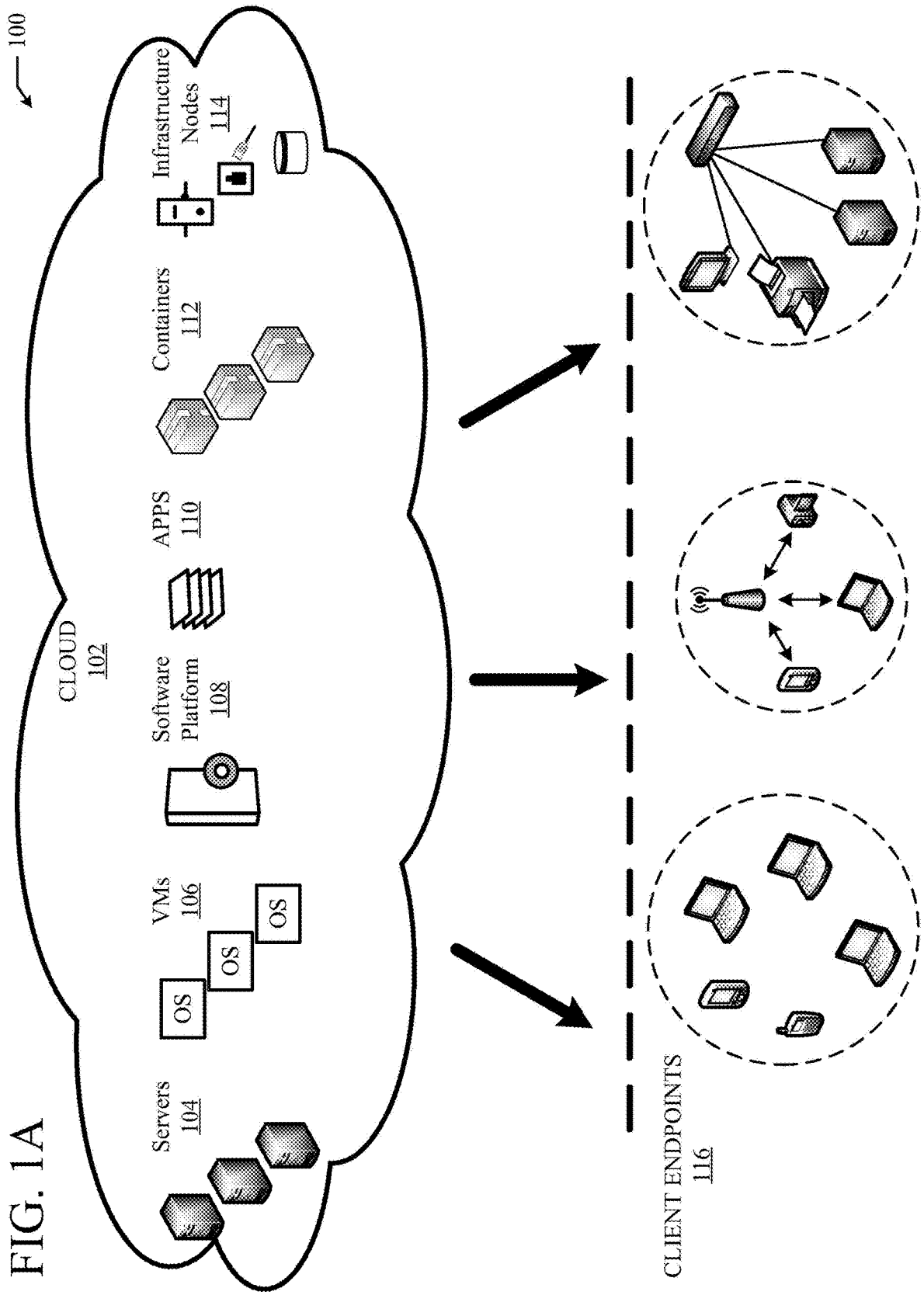
FIG. 1A illustrates an example cloud computing architecture.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Overview

Disclosed are systems, apparatuses, methods, non-transitory computer-readable media, and circuits for dynamic enablement of an RLC mode. According to at least one example, a method may include registering a user equipment (UE) to a 5G radio access network (5G RAN) to establish a session through a gNodeB. The method may also include providing a threshold value for a network characteristic, wherein changes in the network characteristic correlates to changes in radiofrequency channel conditions of the UE. The method may further include sending a trigger to configure the gNodeB to identify when the network characteristic meets the threshold value for selectively controlling operation of the gNodeB at one of a plurality of different operation modes including an initial radio link control (RLC) mode based on the network characteristic. The method may also include establishing the session with the gNodeB operating in the initial RLC mode.

In some examples, the trigger may configure the gNodeB to notify a Digital Network Architecture Center when the network characteristic meets the threshold value. The method may further include receiving, from the gNodeB, an indication that the network characteristic has met the threshold value. The method may also include instructing the gNodeB to change to a new RLC mode, wherein the new RLC mode is different from the initial RLC mode. In some examples, the trigger configures the gNodeB to change to a new RLC mode when the network characteristic meets the threshold value. In some examples, the method may include determining, based on Quality of Service (QoS) flow attributes, the initial RLC mode. In some examples, the method may include providing the initial RLC mode to the gNodeB prior to establishing the session. In some examples, the network characteristic is packet loss/error rate, latency, packet delay budget (PDB), or jitter.

In some examples, the method may include setting a custom configuration in an enterprise network of the 5G RAN, wherein the custom configuration correlates different threshold values with associated RLC modes for different QoS flow attributes. The method may further include sending another trigger to the gNodeB to send a second notification when a different threshold value is met to instruct the gNodeB to change to another RLC mode. In addition, the custom configuration is for a user account or a group of user accounts.

A system can include one or more processors and at least one computer-readable storage medium storing instructions which, when executed by the one or more processors, cause the one or more processors to register a user equipment (UE) to a 5G radio access network (5G RAN) to establish a session through a gNodeB. The instructions may further cause the one or more processors to provide a threshold value for a network characteristic, wherein changes in the network characteristic correlates to changes in radiofrequency channel conditions of the UE. The instructions may further cause the one or more processors to send a trigger to configure the gNodeB to identify when the network characteristic meets the threshold value for selectively controlling operation of the gNodeB at one of a plurality of different operation modes including an initial radio link control (RLC) mode based on the network characteristic. The instructions may further cause the one or more processors to establish the session with the gNodeB operating in the initial RLC mode.

A non-transitory computer-readable storage medium having stored therein instructions which, when executed by a computing system, cause the computing system to register a user equipment (UE) to a 5G radio access network (5G RAN) to establish a session through a gNodeB. The instructions may further cause the computing system to provide a threshold value for a network characteristic, wherein changes in the network characteristic correlates to changes in radiofrequency channel conditions of the UE. The instructions may further cause the computing system to send a trigger to configure the gNodeB to identify when the network characteristic meets the threshold value for selectively controlling operation of the gNodeB at one of a plurality of different operation modes including an initial radio link control (RLC) mode based on the network characteristic. The instructions may further cause the computing system to establish the session with the gNodeB operating in the initial RLC mode.

Description of Example Embodiments

As noted above, fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

3rd Generation Partnership Project (3GPP) Technical Specification (TS) 38.300 and TS 38.322 defines different Radio Link Control (RLC) modes, namely a TM (Transparent Mode), an UM (UnAcknowledged Mode), and an AM (Acknowledged Mode). RLC is a layer 2 Radio Link Protocol used in Universal Mobile Telecommunications System (UMTS), Long Term Evolution (LTE/4G) and 5G on the Air interface. The RLC modes controls the functionality and applicability of the RLC. TM is only applicable for control plane signaling related RLC data packets, whereas AM or UM can be used for control or user plane RLC data packets. The different modes serve different types of applications. For example, UM serves low latency applications while AM is more reliable.

Quality of Service (QoS) flows refer to the measurement of the overall performance of a service experienced by the users of the network. QoS flows are stored in the gNodeB and mapped to Data Radio Bearers (DRBs) based on QoS profiles corresponding to a set of QoS characteristics. The configuration of a RLC mode for a DRB is based on static configuration in a Radio Access Network (RAN). Typically, this is based on an 5G QoS Identifier (5QI) value and/or other fields (e.g Packet Loss/Error Rate (PER), Latency, Packet Delay Budget) associated with that 5QI value. However, the RAN always selects the same RLC mode for a given QoS flow at the time of DRB establishment, wherein the RRC (Radio Resource Control) layer uses the configured mapping in gNodeB and accordingly enables the RLC mode. However, this approach is very limiting.

For example, radio channel conditions may change due to RF interference, electrical interference, weather conditions, UE mobility and various other reasons. Poor radio conditions may cause packet losses and may greatly impact the reliability of the QoS flow. When the UE is experiencing such poor RF conditions, the enablement of the AM mode would greatly improve the reliability of the QoS flow. Equally true is increased RAN throughput with the enablement of the UM mode when the UE is experiencing better RF conditions.

The disclosed technology addresses the need in the art to dynamically select a specific RLC mode based on the RF conditions at the time of DRB creation, or subsequently switch between the RLC modes based on change in RF conditions. For industrial IoT environments, the strict mapping of RLC modes to 5QI values is problematic and a more flexible and adaptive mechanism of RLC mode selection is needed. Therefore, a more flexible and adaptive mechanism of RLC mode selection is needed.

The present technology involves system, methods, and computer-readable media for dynamically selecting a specific RLC mode based on UE's RF conditions, and/or based on the triggers from the enterprise policy/RRM functions. This adaptive approach greatly improves the reliability of the QoS flow when RF conditions are poor. When RAN experiences higher packet losses which are more than the configured threshold, it may inform core network and accordingly core network may change RLC mode of the impacted QoS flow.

Figure 2:
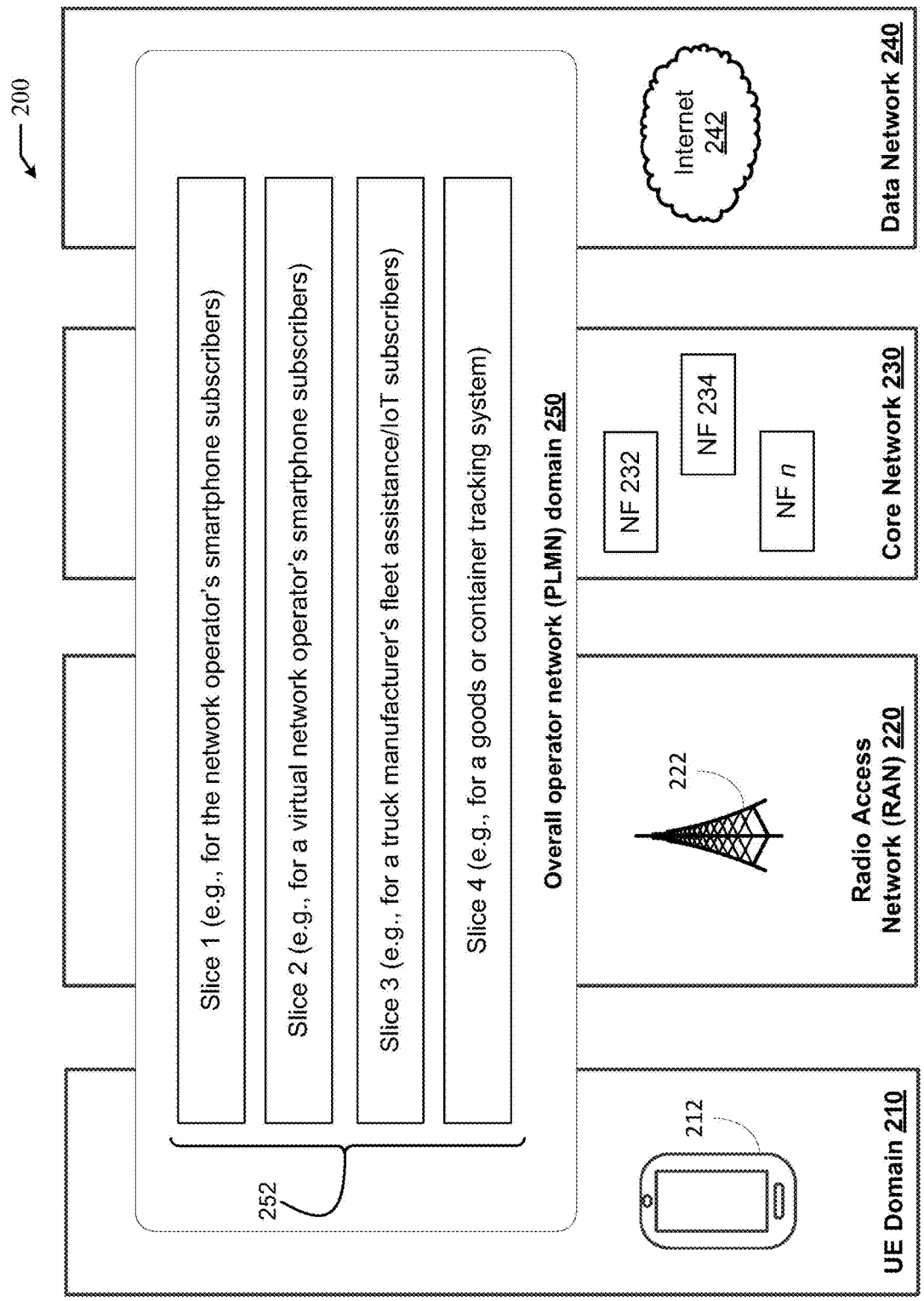
FIG. 2 depicts an example schematic representation of a 5G network environment in which network slicing has been implemented, and in which one or more aspects of the present disclosure may operate.
Figure 5:
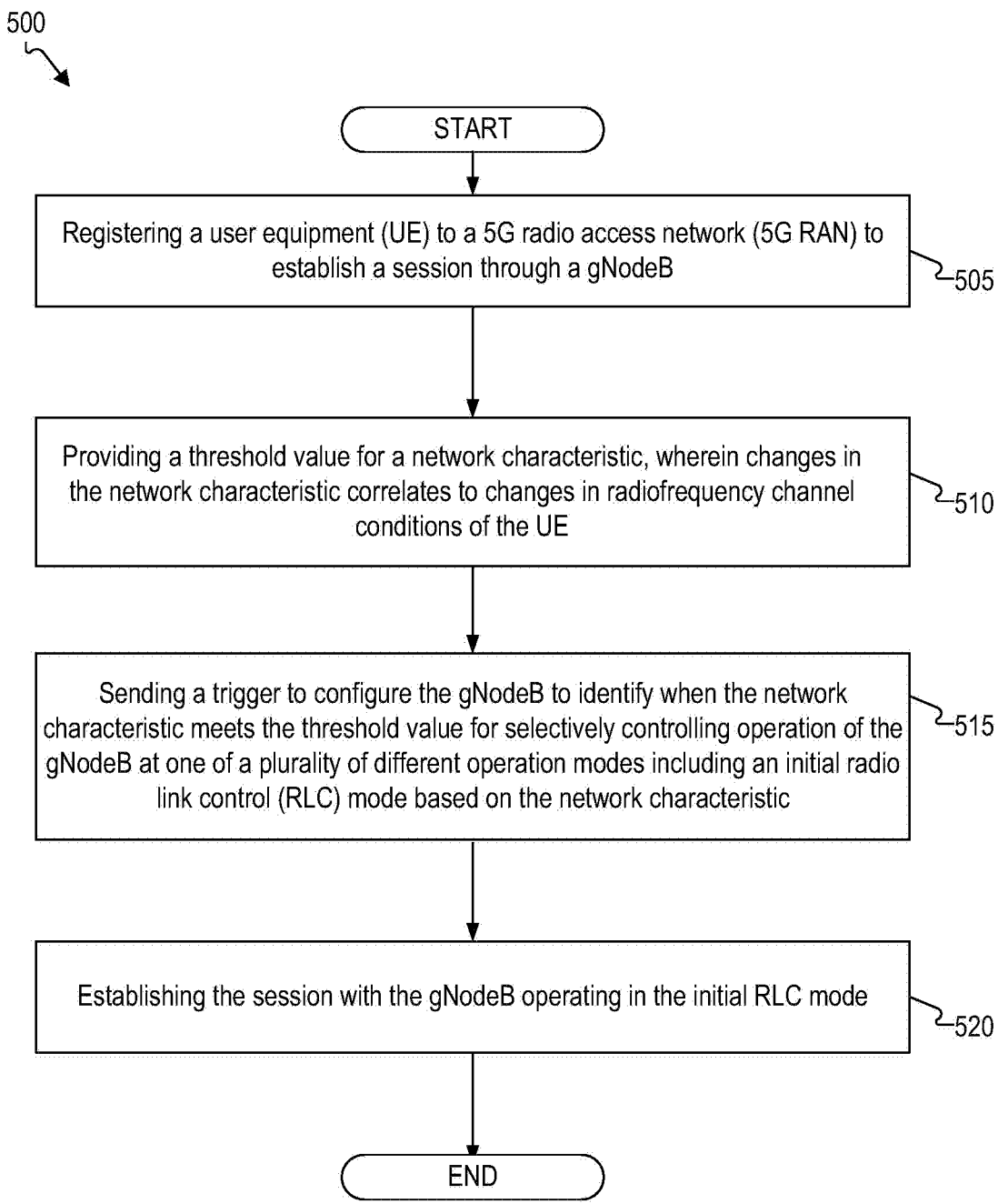
FIG. 5 illustrates an example method for dynamic enablement of a RLC mode, according to an example of the instant disclosure.
Figure 6:
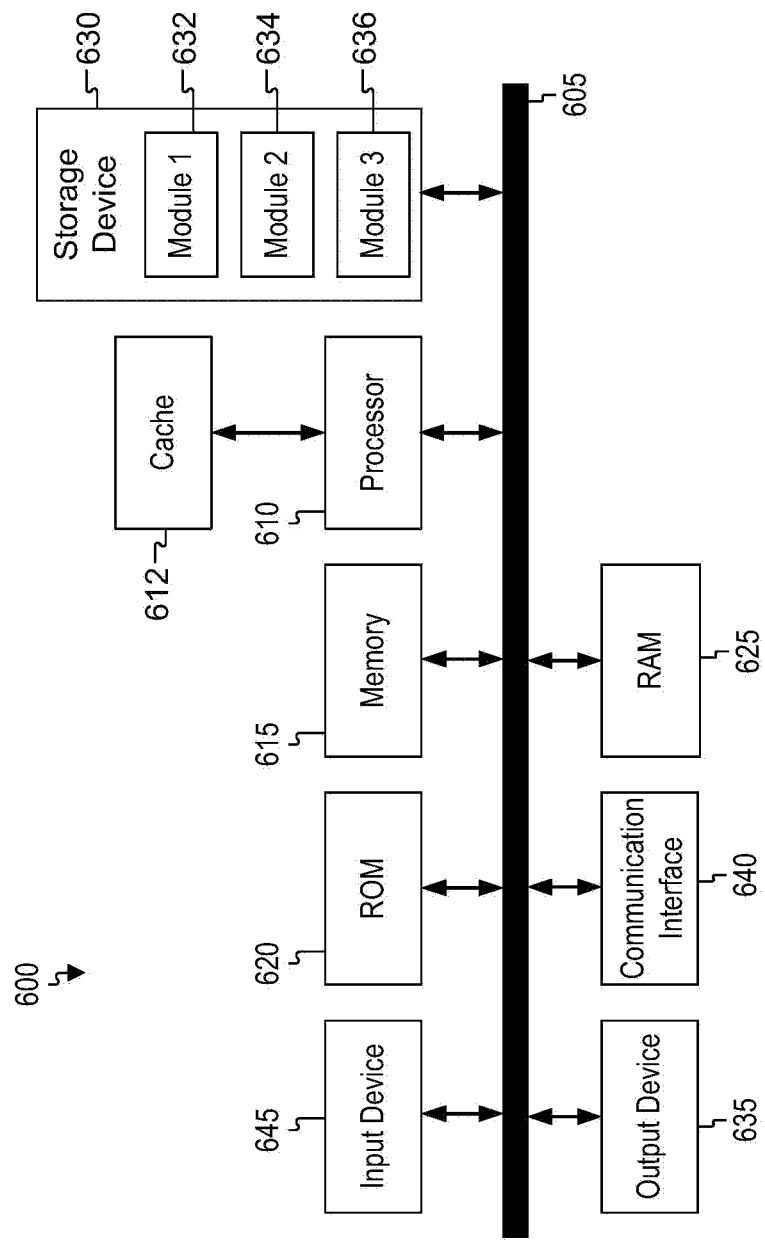
FIG. 6 shows an example of a computing system in accordance with some aspects of the present disclosure.

A description of network environments and architectures for network data access and services, as illustrated in FIGS. 1A, 1B, and 2 is first disclosed herein. A discussion of systems, methods, and computer-readable media for dynamic enablement of a RLC mode, as shown in FIGS. 3-5, will then follow. The discussion then concludes with a brief description of an example device, as illustrated in FIG. 6. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an example schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, ..., n reside; and a Data Network 240, in which one or more data communication networks such as the Internet 242 reside. Additionally, the Data Network 240 can support SaaS providers configured to provide SaaS to enterprises, e.g. to users in the UE domain 210.

Core Network 230 contains a plurality of Network Functions (NFs), shown here as NF 232, NF 234 ... NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

FIG. 3 illustrates a table 300 indicating an example policy function configuration that sets a dynamic enablement RLC mode based on various QoS flow attributes and packet error rate (PER) thresholds, according to an example of the instant disclosure. A Policy Control Function (PCF), which may set configuration as such for a particular enterprise, may be as indicated by example table 300. For example, for a Data Network Name (DNN) of "a.com", DN information, such as Single Network Slice Selection Assistance Information (S-NSSAI) set as 1, appID is "ABC", and with a 5QI value of 1, the default RLC mode is set to the UM-Mode and the threshold for setting a new RLC mode, the AM-Mode, is when the PER is 5 in 100.

For a same DNN of "a.com", same S-NSSAI set as 1, appID is also "ABC", and with a 5QI value of 2, the default RLC mode is set to the UM-Mode and the threshold for setting a new RLC mode, the AM-Mode, is when the PER is 2 in 1000. For when the 5QI value is 4 and the Subscription Permanent Identifier (SUPI) is "abc123", the default RLC mode is set to the UM-Mode and the threshold for setting a new RLC mode, the AM-Mode, is when the PER is 5 in 10^6. When the 5QI value is 4 and the SUPI Range is 111-999, the default RLC mode is set to a gNodeB static configuration and the threshold for setting a new RLC mode, the AM-Mode, is when the PER is 10 in 10^6. Configurations may be sent from an Application Function (AF) to the PCF and/or from a Network Exposure Function (NEF) to a Session Management Function (SMF), or in an enterprise environment from a network controller and management dashboard, such as the Cisco® DNA Center. The flow attributes and thresholds in the example table 300 shown in FIG. 3 are merely examples and in various embodiments, different attributes, types of thresholds, and values of thresholds can be used to define polices associated with controlling the RLC mode.

Figure 4A:
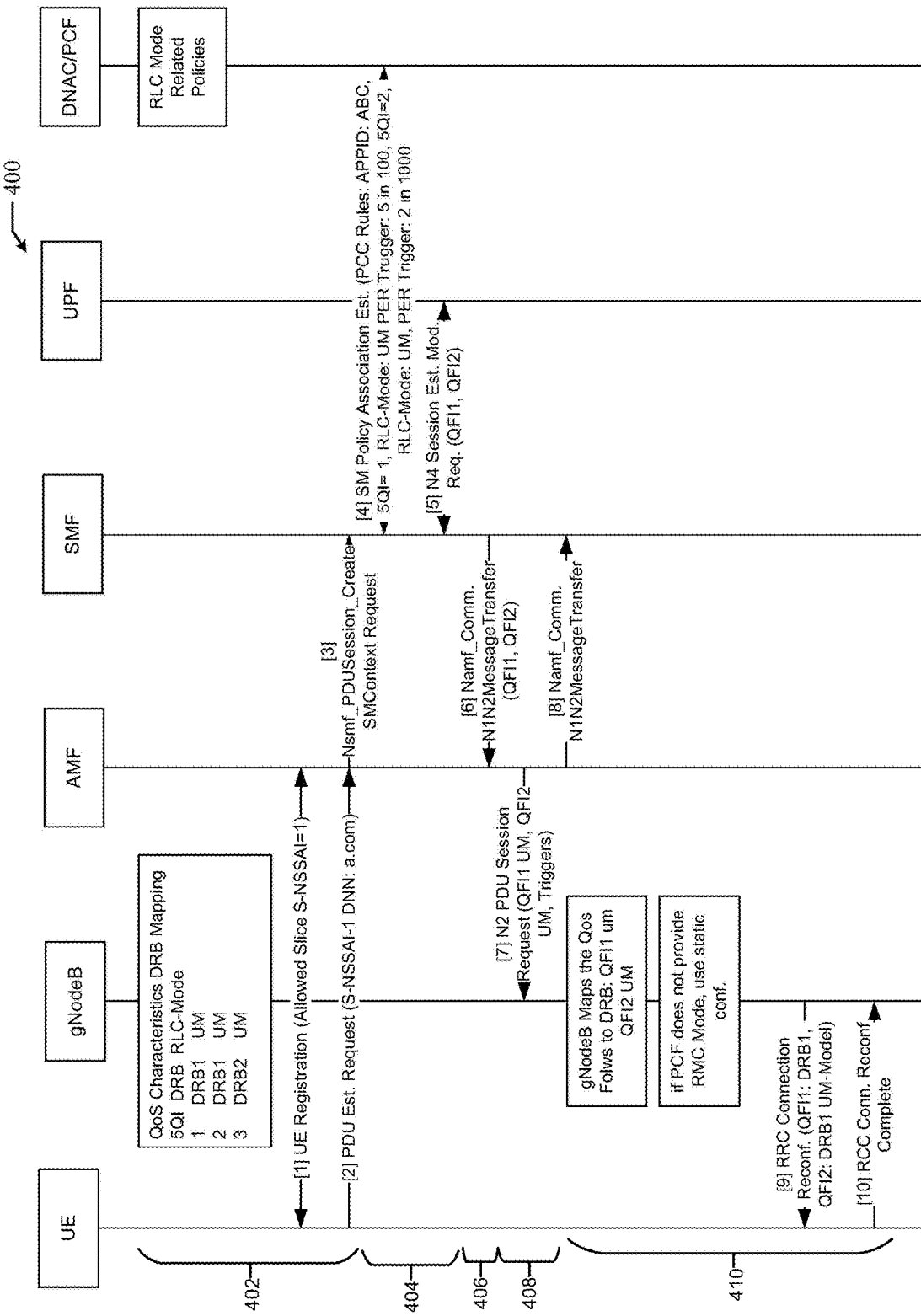
FIGS. 4A-4C illustrate an example flow diagram of RLC mode change with triggers to notify a policy function of a 5G core network (5GC), in accordance with some aspects of the present disclosure.
Figure 4B:
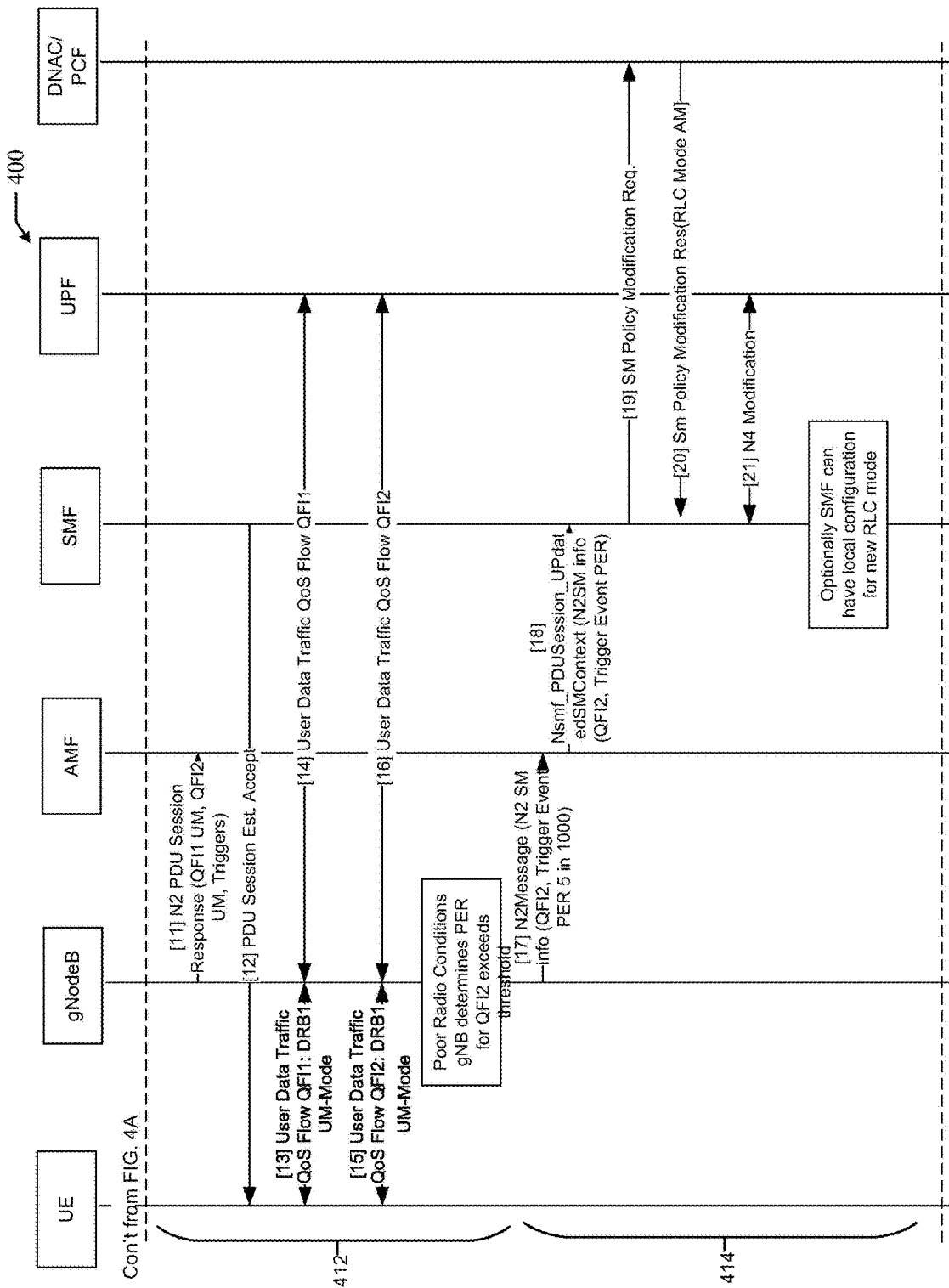
Figure 4C:
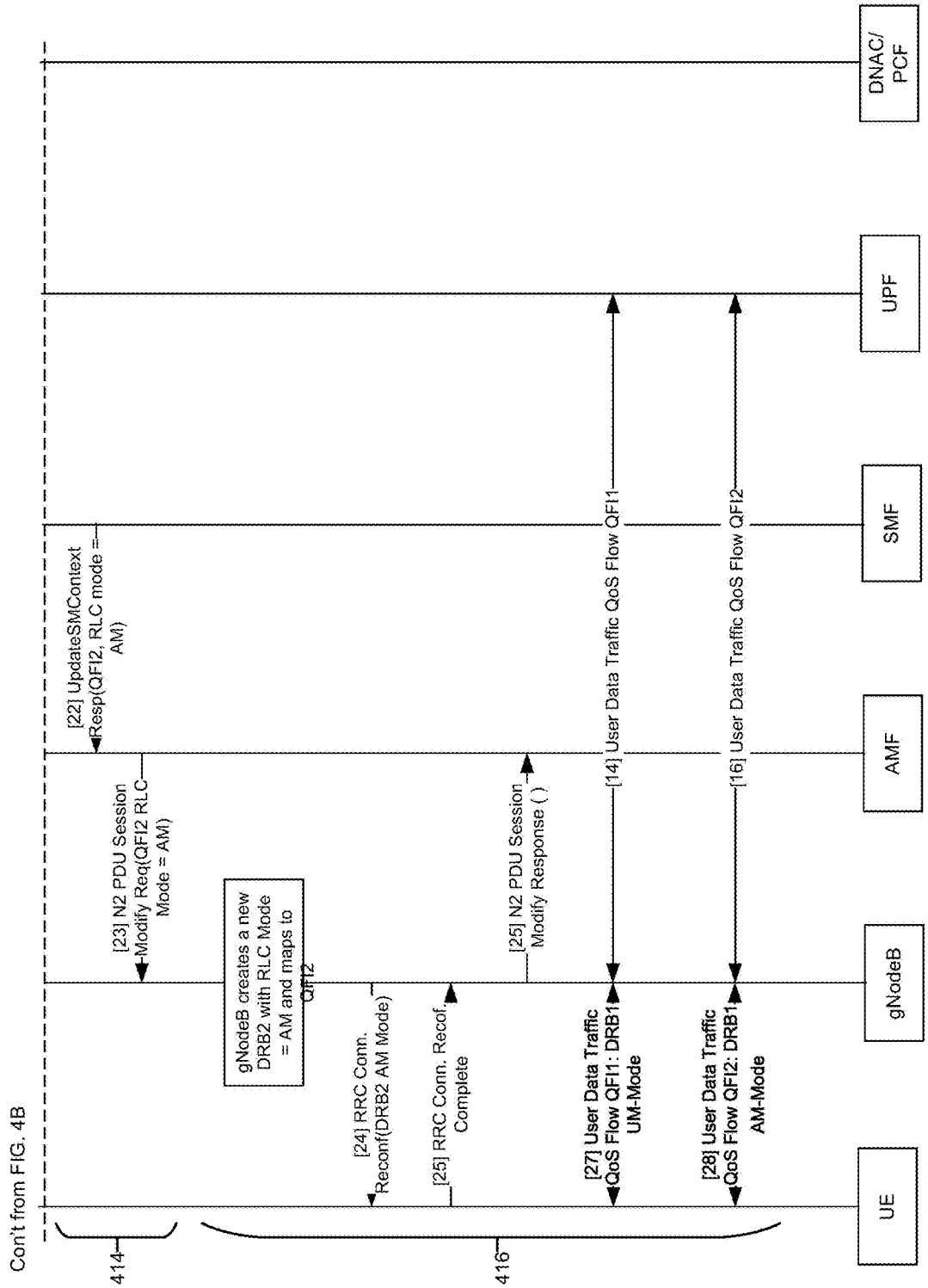

FIGS. 4A-4C illustrates an example flow diagram of RLC mode change with triggers to notify a policy function of a 5G core network (5GC), in accordance with some aspects of the present disclosure. In a first call flow 400, in phase 402 covering steps 1 through 3, a User Equipment (UE) registers to a 5GC and establishes a Protocol Data Unit (PDU) session. Next, in phase 404 covering steps 4 and 5, the PCF provides Policy and Charging Control (PCC) Rules for the QoS flows, which may include RLC Mode as well, to SMF. If the PCF does not provide the RLC Mode, the gNodeB can use statically configured the RLC Mode. The PCF also provides a trigger and threshold value for packet loss so that it is notified based on packet loss due to a bad radio condition in relation to a threshold.

Then, in phase 406 cover step 6, the SMF sends QoS profile and other N2 Session Management (SM) information to the AMF. The SMF installs a trigger on the gNodeB along with packet loss threshold. The SMF can have this policy locally as well or can receive the policy from the PCF. In phase 408 covering steps 7 and 8, the AMF establishes the PDU resource for DRB establishment and provides the QoS characteristics to the gNodeB. In phase 410 covering steps 9 and 10, the gNodeB finds the mapped DRB from its configuration and establishes the DRBs. If the AMF has provided the RLC mode, the gNodeB enables the same RLC mode. Otherwise, the gNodeB enables the default RLC mode from its configuration.

During the PDU session, in phase 412 covering steps 11 through 16, bad radio channel conditions may occur at any moment. Bad radio channel conditions/bad radio conditions, as used herein, refers to applicable conditions which disrupt or otherwise prevent network service access over a given radio channel. In particular, bad radio channel conditions, as used herein, include conditions associated with a radio channel that change or otherwise degrade a QoS associated with a flow for accessing network services through the radio channel. Multiple QoS attributes can be used to measure/quantify bad radio channel condition e.g. packet loss/error rate (PER), latency, packet delay budget or even jitter. For example, comparison of Packet Loss Count for a given QoS Flow(s), at gNodeB, with respect to a threshold. For example, a comparison of packet loss count for a given QoS flow may exceed a configured threshold. Then, it can be determined that bad channel conditions exist. The RAN-EMS receiving statistics from gNodeB may determine packet loss has exceeded threshold and may notify the gNodeB/DNAC and gNodeB/DNAC may notify it to SMF/PCF.

In phase 414 covering step 17 through 23, when the gNodeB determines that packet loss has exceeded threshold, it notifies the SMF. The SMF may further notify PCF and based on PCF authorization, the SMF may instruct the gNodeB (via the AMF) to change the RLC mode to a new RLC mode. Optionally, the SMF can trigger RLC mode change based on local configuration.

In phase 416 covering step 24 through 28, the gNodeB creates a new DRB and maps the affected QoS flow to a new DRB. If a previous DRB of QoS Flow does not have any other QoS flow, gNodeB releases the previous DRB.

Figure 4D:
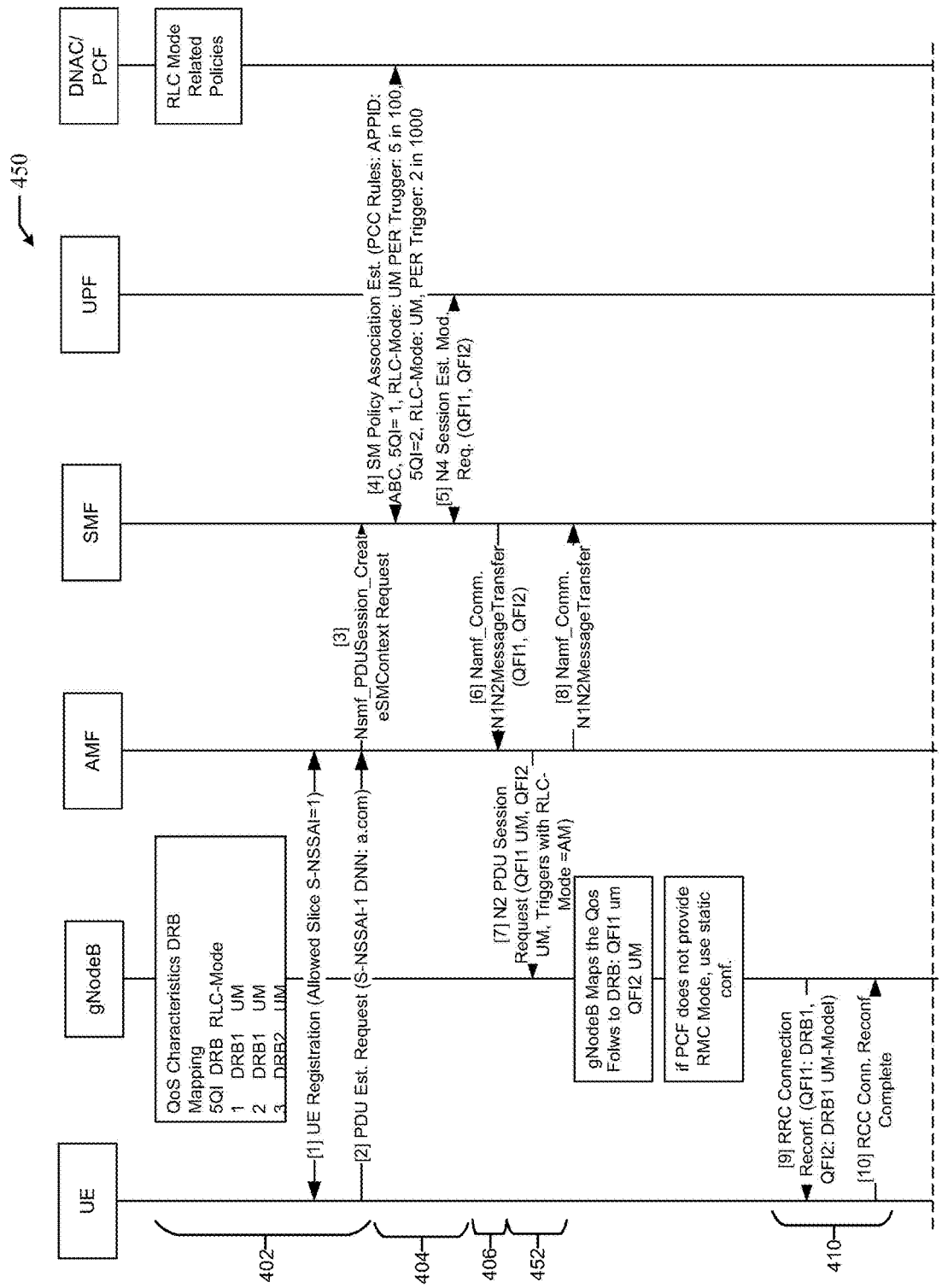
FIGS. 4D-4E illustrate an example flow diagram of RLC mode change with policy triggers on a gNodeB (gNB) programmed during session establishment, in accordance with some aspects of the present disclosure.
Figure 4E:
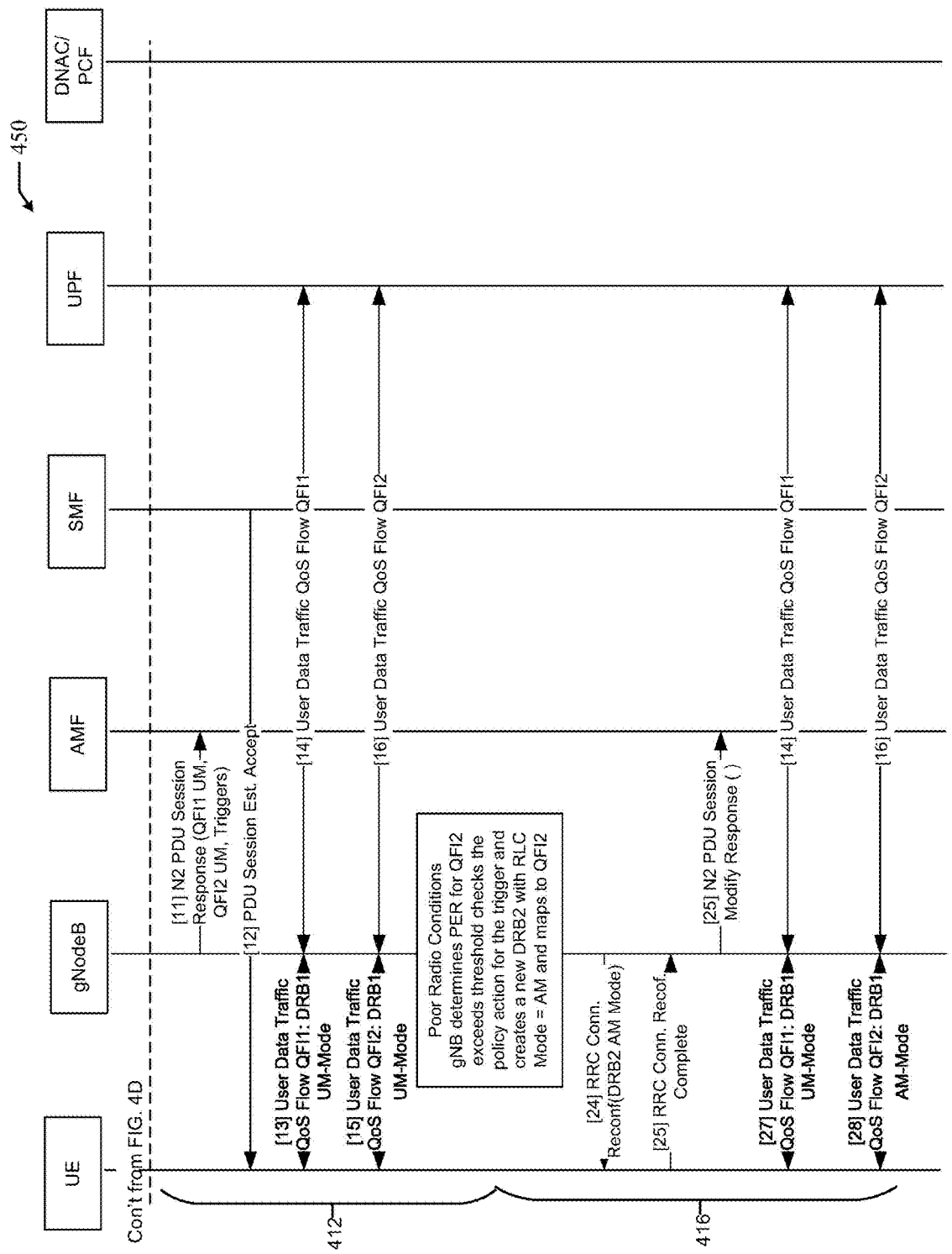

FIGS. 4D-4E illustrates an example flow diagram of RLC mode change with policy triggers on a gNB programmed during session establishment, in accordance with some aspects of the present disclosure. In a second call-flow 450, the phases 402 through 406 are the same as the first call-flow 400. Contrary to phase 408 during with AMF establishes the PDU resource for DRB establishment and provides the QoS characteristics to the gNodeB, in phase 452, the AMF provides the gNB the trigger as well as the policy action information for changing the RLC-Mode to AM during the PDU session establishment procedure itself in the N2 PDU session request. Consequently, when the gNB detects the poor radio condition and trigger for PER exceeding threshold is detected then gNB checks the above programmed action and changes the RLC-Mode to AM by creating a new DRB for QFI2 and sends a Radio Resource Control (RRC) Connection Reconfiguration to UE. The optimization in the second call-flow 450 is saves message exchanges between the packet core and gNB for getting the RLC-Mode update to AM as the action is sent to gNB during PDU session establishment itself.

Furthermore, policy action may get set at a group level or a per user level for RLC-Mode change to AM. In an enterprise network, besides 5QI, there is need to provide differential treatment for following for (1) set or group of users belonging to a particular department or function for example executives or critical department machines/devices etc. and/or (2) an individual user level policy. Such policies can be programmed on PCF for set of users/group and can have PER thresholds defined based on criticality of user/group and further RLC-mode can be changed AM for such user group, and may be in addition to initially mentioned per DNN/5QI level policy triggers.

FIG. 5 illustrates an example method for dynamic enablement of a RLC mode, according to an example of the instant disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes registering a user equipment (UE) to a 5G radio access network (5G RAN) to establish a session through a gNodeB at step 505. For example, the NFs of the Core Network 230, such as the AMF or SMF, illustrated in FIGS. 2, 4A-4E may register a user equipment (UE) to a 5G radio access network (5G RAN) to establish a session through a gNodeB.

According to some examples, the method includes providing a threshold value for a network characteristic, wherein changes in the network characteristic correlates to changes in radiofrequency channel conditions of the UE at step 510. For example, the NFs of the Core Network 230, such as the AMF or SMF, illustrated in FIGS. 2, 4A-4E may provide a threshold value for a network characteristic, wherein changes in the network characteristic correlates to changes in radiofrequency channel conditions of the UE.

According to some examples, the method includes sending a trigger to configure the gNodeB to identify when the network characteristic meets the threshold value for selectively controlling operation of the gNodeB at one of a plurality of different operation modes including an initial radio link control (RLC) mode based on the network characteristic at step 515. For example, the NFs of the Core Network 230, such as the AMF or SMF, illustrated in FIGS. 2, 4A-4E may send a trigger to configure the gNodeB to identify when the network characteristic meets the threshold value for selectively controlling operation of the gNodeB at one of a plurality of different operation modes including an initial radio link control (RLC) mode based on the network characteristic According to some examples, the method includes establishing the session with the gNodeB operating in the initial RLC mode at step 520. For example, the NFs of the Core Network 230, such as the AMF or SMF, illustrated in FIGS. 2, 4A-4E may establish the session with the gNodeB operating in the initial RLC mode. In some examples, the trigger configures the gNodeB to notify a Digital Network Architecture Center when the network characteristic meets the threshold value.

According to some examples, the method includes receiving, from the gNodeB, an indication that the network characteristic has met the threshold value. For example, the NFs of the Core Network 230, such as the AMF or SMF, illustrated in FIGS. 2, 4A-4E may receive, from the gNodeB, an indication that the network characteristic has met the threshold value.

According to some examples, the method includes instructing the gNodeB to change to a new RLC mode, wherein the new RLC mode is different from the initial RLC mode. For example, the NFs of the Core Network 230, such as the AMF or SMF, illustrated in FIGS. 2, 4A-4E may instruct the gNodeB to change to a new RLC mode, wherein the new RLC mode is different from the initial RLC mode. In some examples, the trigger configures the gNodeB to change to a new RLC mode when the network characteristic meets the threshold value.

According to some examples, the method includes determining, based on Quality of Service (QoS) flow attributes, the initial RLC mode. For example, the NFs of the Core Network 230, such as the AMF or SMF, illustrated in FIGS. 2, 4A-4E may determine, based on Quality of Service (QoS) flow attributes, the initial RLC mode. According to some examples, the method includes providing the initial RLC mode to the gNodeB prior to establishing the session. For example, the NFs of the Core Network 230, such as the AMF or SMF, illustrated in FIGS. 2, 4A-4E may provide the initial RLC mode to the gNodeB prior to establishing the session. In some examples, the network characteristic is packet loss/error rate, latency, packet delay budget (PDB), or jitter.

According to some examples, the method includes setting a custom configuration in an enterprise network of the 5G RAN, wherein the custom configuration correlates different threshold values with associated RLC modes for different QoS flow attributes. For example, the NFs of the Core Network 230, such as the AMF or SMF, illustrated in FIGS. 2, 4A-4E may set a custom configuration in an enterprise network of the 5G RAN, wherein the custom configuration correlates different threshold values with associated RLC modes for different QoS flow attributes.

According to some examples, the method includes sending another trigger to the gNodeB to send a second notification when a different threshold value is met to instruct the gNodeB to change to another RLC mode. For example, the NFs of the Core Network 230, such as the AMF or SMF, illustrated in FIGS. 2, 4A-4E may send another trigger to the gNodeB to send a second notification when a different threshold value is met to instruct the gNodeB to change to another RLC mode. In some examples, custom configuration is for a user account or a group of user accounts.

According to some examples, a SM Policy Association Establishment message from the Policy Control Function to a Session Management Function may carry a 5QI value, network characteristics, corresponding threshold, and RLC-Mode details. For example, the NFs of the Core Network 230, such as the PCF, illustrated in FIGS. 2, 4A-4E, may send a SM Policy Association Establishment message to a Session Management Function, and the SM Policy Association Establishment message may carry a 5QI value, network characteristics, corresponding threshold, and RLC-Mode details.

According to some examples, a N2 PDU Session Request message from an Access and Mobility Management Function to the gNB may carry a 5QI value, network characteristics, corresponding threshold, and RLC-Mode details. For example, the NFs of the Core Network 230, such as the AMF, illustrated in FIGS. 2, 4A-4E, may send a N2 PDU Session Request message to the gNodeB, and the N2 PDU Session Request message may carry a 5QI value, network characteristics, corresponding threshold, and RLC-Mode details.

FIG. 6 shows an example of a computing system in accordance with some aspects of the present disclosure. FIG. 6 shows an example of computing system 600, which can be for example any computing device making up the core network 230, or any component thereof in which the components of the system are in communication with each other using connection 605. Connection 605 can be a physical connection via a bus, or a direct connection into one or more processors 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to one or more processors 610. Computing system 600 can include a cache of high-speed memory 612 connected directly with, in close proximity to, or integrated as part of process one or more processors 610.

One or more processors 610 can include any general purpose processor and a hardware service or software service, such as services 632, 634, and 636 stored in storage device 630, configured to control processor 610 as well as a special-purpose processor where software instructions are incorporated into the actual processor design. One or more processors 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the one or more processors 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A computer-implemented method comprising: registering a user equipment (UE) to a 5G radio access network (5G RAN) to establish a session through a gNodeB; providing a threshold value for a network characteristic, wherein changes in the network characteristic correlates to changes in radiofrequency channel conditions of the UE; sending a trigger to configure the gNodeB to identify when the network characteristic meets the threshold value for selectively controlling operation of the gNodeB at one of a plurality of different operation modes including an initial radio link control (RLC) mode based on the network characteristic; and establishing the session with the gNodeB operating in the initial RLC mode.

Aspect 2. The computer-implemented method of Aspect 1, wherein the trigger configures the gNodeB to notify a Digital Network Architecture Center when the network characteristic meets the threshold value, the computer-implemented method further comprising: receiving, from the gNodeB, an indication that the network characteristic has met the threshold value; and instructing the gNodeB to change to a new RLC mode, wherein the new RLC mode is different from the initial RLC mode.

Aspect 3. The computer-implemented method of any of Aspects 1 to 2, wherein the trigger configures the gNodeB to change to a new RLC mode when the network characteristic meets the threshold value.

Aspect 4. The computer-implemented method of any of Aspects 1 to 3, further comprising: determining, based on Quality of Service (QoS) flow attributes, the initial RLC mode; and providing the initial RLC mode to the gNodeB prior to establishing the session.

Aspect 5. The computer-implemented method of any of Aspects 1 to 4, wherein the network characteristic is packet loss/error rate, latency, packet delay budget (PDB), or jitter.

Aspect 6. The computer-implemented method of any of Aspects 1 to 5, further comprising: setting a custom configuration in an enterprise network of the 5G RAN, wherein the custom configuration correlates different threshold values with associated RLC modes for different QoS flow attributes; and sending another trigger to the gNodeB to send a second notification when a different threshold value is met to instruct the gNodeB to change to another RLC mode.

Aspect 7. The computer-implemented method of any of Aspects 1 to 6, wherein the custom configuration is for a user account or a group of user accounts.

Aspect 8: A system includes a storage (implemented in circuitry) configured to store instructions and a processor. The processor configured to execute the instructions and cause the processor to: register a user equipment (UE) to a 5G radio access network (5G RAN) to establish a session through a gNodeB; provide a threshold value for a network characteristic, wherein changes in the network characteristic correlates to changes in radiofrequency channel conditions of the UE; send a trigger to configure the gNodeB to identify when the network characteristic meets the threshold value for selectively controlling operation of the gNodeB at one of a plurality of different operation modes including an initial radio link control (RLC) mode based on the network characteristic; and establish the session with the gNodeB operating in the initial RLC mode.

Aspect 9: The system of Aspect 8, wherein the trigger configures the gNodeB to notify a Digital Network Architecture Center when the network characteristic meets the threshold value, the computer-implemented method further comprising: receiving, from the gNodeB, an indication that the network characteristic has met the threshold value; and instruct the gNodeB to change to a new RLC mode, wherein the new RLC mode is different from the initial RLC mode.

Aspect 10: The system of any of Aspects 8 to 9, wherein the trigger configures the gNodeB to change to a new RLC mode when the network characteristic meets the threshold value.

Aspect 11: The system of any of Aspects 8 to 10, wherein determining, based on Quality of Service (QoS) flow attributes, the initial RLC mode; and provide the initial RLC mode to the gNodeB prior to establishing the session.

Aspect 12: The system of any of Aspects 8 to 11, wherein the network characteristic is packet loss/error rate, latency, packet delay budget (PDB), or jitter.

Aspect 13: The system of any of Aspects 8 to 12, wherein the processor is configured to execute the instructions and cause the processor to: set a custom configuration in an enterprise network of the 5G RAN, wherein the custom configuration correlates different threshold values with associated RLC modes for different QoS flow attributes; and send another trigger to the gNodeB to send a second notification when a different threshold value is met to instruct the gNodeB to change to another RLC mode.

Aspect 14: The system of any of Aspects 8 to 13, wherein the custom configuration is for a user account or a group of user accounts.

Aspect 15: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: register a user equipment (UE) to a 5G radio access network (5G RAN) to establish a session through a gNodeB; provide a threshold value for a network characteristic, wherein changes in the network characteristic correlates to changes in radiofrequency channel conditions of the UE; send a trigger to configure the gNodeB to identify when the network characteristic meets the threshold value for selectively controlling operation of the gNodeB at one of a plurality of different operation modes including an initial radio link control (RLC) mode based on the network characteristic; and establish the session with the gNodeB operating in the initial RLC mode.

Aspect 16: The computer readable medium of Aspect 15, wherein the trigger configures the gNodeB to notify a Digital Network Architecture Center when the network characteristic meets the threshold value, the computer-implemented method further comprising: receiving, from the gNodeB, an indication that the network characteristic has met the threshold value; and instruct the gNodeB to change to a new RLC mode, wherein the new RLC mode is different from the initial RLC mode.

Aspect 17: The computer readable medium of any of Aspects 15 to 16, wherein the trigger configures the gNodeB to change to a new RLC mode when the network characteristic meets the threshold value.

Aspect 18: The computer readable medium of any of Aspects 15 to 17, wherein determining, based on Quality of Service (QoS) flow attributes, the initial RLC mode; and provide the initial RLC mode to the gNodeB prior to establishing the session.

Aspect 19: The computer readable medium of any of Aspects 15 to 18, wherein the network characteristic is packet loss/error rate, latency, packet delay budget (PDB), or jitter.

Aspect 20: The computer readable medium of any of Aspects 15 to 19, wherein the processor is configured to execute the computer readable medium and cause the processor to: set a custom configuration in an enterprise network of the 5G RAN, wherein the custom configuration correlates different threshold values with associated RLC modes for different QoS flow attributes; and send another trigger to the gNodeB to send a second notification when a different threshold value is met to instruct the gNodeB to change to another RLC mode.

Aspect 21: The computer readable medium of any of Aspects 15 to 20, wherein the custom configuration is for a user account or a group of user accounts.

Aspect 22: The computer readable medium of any of Aspects 15 to 20, wherein a SM Policy Association Establishment message from the Policy Control Function to a Session Management Function carries a 5QI value, network characteristics, corresponding threshold, and RLC-Mode details.

Aspect 22: The computer readable medium of any of Aspects 15 to 20, wherein a N2 PDU Session Request message from an Access and Mobility Management Function to the gNB carries a 5QI value, network characteristics, corresponding threshold, and RLC-Mode details.

What is claimed is:

1. A computer-implemented method comprising:
registering a user equipment (UE) to a 5G radio access network (5G RAN) to establish a session through a gNodeB;
setting a custom configuration in an enterprise network of the 5G RAN, wherein the custom configuration is for a user account or a group of user accounts and correlates different threshold values with associated radio link control (RLC) modes for different Quality of Service (QoS) flow attributes;
providing a threshold value for a network characteristic, wherein changes in the network characteristic correlates to changes in radiofrequency channel conditions of the UE;
sending a trigger to configure the gNodeB to identify when the network characteristic meets the threshold value for selectively controlling operation of the gNodeB at one of a plurality of different operation modes including an initial radio link control (RLC) mode based on the network characteristic; and
establishing the session with the gNodeB operating in the initial RLC mode.

2. The computer-implemented method of claim 1, wherein the trigger configures the gNodeB to notify a Digital Network Architecture Center or Policy Control Function when the network characteristic meets the threshold value, the computer-implemented method further comprising:
receiving, from the gNodeB, an indication that the network characteristic has met the threshold value; and
instructing the gNodeB to change to a new RLC mode, wherein the new RLC mode is different from the initial RLC mode.

3. The computer-implemented method of claim 1, wherein the trigger configures the gNodeB to change to a new RLC mode when the network characteristic meets the threshold value.

4. The computer-implemented method of claim 1, further comprising:
determining, based on Quality of Service (QoS) flow attributes, the initial RLC mode; and
providing the initial RLC mode to the gNodeB prior to establishing the session.

5. The computer-implemented method of claim 1, wherein the network characteristic is packet loss/error rate, latency, packet delay budget (PDB), or jitter.

6. The computer-implemented method of claim 1, further comprising:
sending another trigger to the gNodeB to send a second notification when a different threshold value is met to instruct the gNodeB to change to another RLC mode.

7. A system comprising:
a storage configured to store instructions; and
a processor configured to execute the instructions and cause the processor to:
register a user equipment (UE) to a 5G radio access network (5G RAN) to establish a session through a gNodeB;
set a custom configuration in an enterprise network of the 5G RAN, wherein the custom configuration is for a user account or a group of user accounts and correlates different threshold values with associated radio link control (RLC) modes for different Quality of Service (QoS) flow attributes;
provide a threshold value for a network characteristic, wherein changes in the network characteristic correlates to changes in radiofrequency channel conditions of the UE;
send a trigger to configure the gNodeB to identify when the network characteristic meets the threshold value for selectively controlling operation of the gNodeB at one of a plurality of different operation modes including an initial radio link control (RLC) mode based on the network characteristic; and
establish the session with the gNodeB operating in the initial RLC mode.

8. The system of claim 7, wherein the trigger configures the gNodeB to notify a Digital Network Architecture Center or Policy Control Function when the network characteristic meets the threshold value, the processor further caused to:
receive, from the gNodeB, an indication that the network characteristic has met the threshold value; and
instruct the gNodeB to change to a new RLC mode, wherein the new RLC mode is different from the initial RLC mode.

9. The system of claim 7, wherein the trigger configures the gNodeB to change to a new RLC mode when the network characteristic meets the threshold value.

10. The system of claim 7, the processor further caused to:
determining, based on Quality of Service (QoS) flow attributes, the initial RLC mode; and
provide the initial RLC mode to the gNodeB prior to establishing the session.

11. The system of claim 7, wherein the network characteristic is packet loss/error rate, latency, packet delay budget (PDB), or jitter.

12. The system of claim 7, wherein the processor is configured to execute the instructions and cause the processor to:
send another trigger to the gNodeB to send a second notification when a different threshold value is met to instruct the gNodeB to change to another RLC mode.

13. A non-transitory computer readable medium comprising instructions, the instructions, when executed by a computing system, cause the computing system to:
register a user equipment (UE) to a 5G radio access network (5G RAN) to establish a session through a gNodeB;
set a custom configuration in an enterprise network of the 5G RAN, wherein the custom configuration is for a user account or a group of user accounts and correlates different threshold values with associated radio link control (RLC) modes for different Quality of Service (QoS) flow attributes;
provide a threshold value for a network characteristic, wherein changes in the network characteristic correlates to changes in radiofrequency channel conditions of the UE;
send a trigger to configure the gNodeB to identify when the network characteristic meets the threshold value for selectively controlling operation of the gNodeB at one of a plurality of different operation modes including an initial radio link control (RLC) mode based on the network characteristic; and
establish the session with the gNodeB operating in the initial RLC mode.

14. The computer readable medium of claim 13, wherein the trigger configures the gNodeB to notify a Digital Network Architecture Center or Policy Control Function when the network characteristic meets the threshold value, wherein the computer readable medium further comprises instructions that, when executed by the computing system, cause the computing system to:
receive, from the gNodeB, an indication that the network characteristic has met the threshold value; and
instruct the gNodeB to change to a new RLC mode, wherein the new RLC mode is different from the initial RLC mode.

15. The computer readable medium of claim 13, the trigger configures the gNodeB to change to a new RLC mode when the network characteristic meets the threshold value.

16. The computer readable medium of claim 13, wherein the computer readable medium further comprises instructions that, when executed by the computing system, cause the computing system to:
   determine, based on Quality of Service (QoS) flow attributes, the initial RLC mode; and
   provide the initial RLC mode to the gNodeB prior to establishing the session.

17. The computer readable medium of claim 13, wherein a Session Management (SM) Policy Association Establishment message from the Policy Control Function to a Session Management Function carries a 5G QoS Identifier (5QI) value, network characteristics, corresponding threshold, and RLC-Mode details.

18. The computer readable medium of claim 13, wherein a Reference Point (N2) PDU Session Request message from an Access and Mobility Management Function to the gNB carries a 5QI value, network characteristics, corresponding threshold, and RLC-Mode details.

* * * * *